United States Patent
Löfqvist et al.

(10) Patent No.: US 10,955,292 B2
(45) Date of Patent: Mar. 23, 2021

(54) DETECTOR SYSTEM COMPRISING A PLURALITY OF LIGHT GUIDES AND A SPECTROMETER COMPRISING THE DETECTOR SYSTEM

(71) Applicant: BOMILL AB, Vintrie (SE)

(72) Inventors: Bo Löfqvist, Lund (SE); Per Horvath, Hörby (SE)

(73) Assignee: BOMILL AB, Vintrie (SE)

( * ) Notice: Subject to any disclaimer, the term of this patent is extended or adjusted under 35 U.S.C. 154(b) by 0 days.

(21) Appl. No.: 16/307,686

(22) PCT Filed: Jun. 12, 2017

(86) PCT No.: PCT/SE2017/050621
§ 371 (c)(1),
(2) Date: Dec. 6, 2018

(87) PCT Pub. No.: WO2017/213582
PCT Pub. Date: Dec. 14, 2017

(65) Prior Publication Data
US 2019/0301934 A1    Oct. 3, 2019

(30) Foreign Application Priority Data
Jun. 10, 2016   (SE) .................................. 1650816-0

(51) Int. Cl.
*G01J 3/10* (2006.01)
*B07C 5/34* (2006.01)
(Continued)

(52) U.S. Cl.
CPC ................ *G01J 3/108* (2013.01); *B07C 5/34* (2013.01); *G01J 3/02* (2013.01); *G01J 3/0208* (2013.01);
(Continued)

(58) Field of Classification Search
CPC .. G01J 3/108; G01J 3/28; G01J 3/0218; G01J 3/32; G01J 3/0208; G01J 3/10; G01J 3/02;
(Continued)

(56) References Cited

U.S. PATENT DOCUMENTS 4,927,265 A * 5/1990 Brownlee ............... G01N 21/31
204/603
5,210,590 A   5/1993 Landa et al.
(Continued)

FOREIGN PATENT DOCUMENTS

EP        0109536 A1    5/1984
EP        0109536 B1 *  2/1987   ........... G01N 21/253
(Continued)

OTHER PUBLICATIONS https://en.wikipedia.org/wiki/Xenon_arc_lamp.*
(Continued)

*Primary Examiner* — Mohamed K Amara
(74) *Attorney, Agent, or Firm* — Ballard Spahr LLP

(57) ABSTRACT

A detector system is disclosed herein that includes a plurality of light guides. Each light guide is guiding incoming light from a respective object in use, wherein the incoming light is provided by means of an illuminating means. The detector system comprises diffracting means for diffracting the incoming light in different wavelength ranges, at least one focuser for projecting the incoming light exiting the light guides onto the diffracting means, a detector having a detector area for receiving the diffracted light from the plurality of Sight guides, and a control unit. These are arranged to pulsate incoming light via only one light guide at a time based on a pulse timing parameter, and record a spectrum of light diffracted from each light guide and detected by the detector based on the pulse timing parameter.

15 Claims, 2 Drawing Sheets

(51) Int. Cl.
  *G01J 3/28* (2006.01)
  *G01J 3/36* (2006.01)
  *G01J 3/02* (2006.01)
  *G01N 21/31* (2006.01)
  *G01J 3/32* (2006.01)
  *G01N 21/85* (2006.01)

(52) U.S. Cl.
  CPC ............ *G01J 3/0218* (2013.01); *G01J 3/10* (2013.01); *G01J 3/28* (2013.01); *G01J 3/2803* (2013.01); *G01J 3/32* (2013.01); *G01J 3/36* (2013.01); *G01N 21/31* (2013.01); *G01J 2003/104* (2013.01); *G01N 2021/3137* (2013.01); *G01N 2021/8592* (2013.01); *G01N 2201/0833* (2013.01)

(58) Field of Classification Search
  CPC ...... G01J 3/36; G01J 3/2803; G01J 2003/104; G01N 21/31; G01N 2201/0833; G01N 2021/8592; G01N 2021/3137; G01N 21/27; B07C 5/34
  See application file for complete search history.

(56) References Cited

U.S. PATENT DOCUMENTS

| | | | |
|---|---|---|---|
| 5,239,180 A | 8/1993 | Clarke | |
| 5,815,611 A * | 9/1998 | Dhadwal | B82Y 15/00 385/12 |
| 6,166,804 A * | 12/2000 | Potyrailo | G01N 21/643 250/458.1 |
| 6,377,842 B1 * | 4/2002 | Pogue | A61B 5/0059 250/458.1 |
| 6,519,032 B1 * | 2/2003 | Kuebler | B01D 15/08 356/246 |
| 7,041,960 B2 * | 5/2006 | Sato | G01L 1/242 250/227.14 |
| 7,522,786 B2 * | 4/2009 | Kiesel | G01J 3/02 356/451 |
| 7,920,267 B2 * | 4/2011 | Cho | G01N 21/553 356/445 |
| 7,982,874 B2 * | 7/2011 | Kovalenko | G01N 15/0205 356/336 |
| 8,976,353 B2 * | 3/2015 | Larkin | G01N 21/253 356/338 |
| 9,341,564 B2 * | 5/2016 | McNeil-Watson | B01L 3/5025 |
| 9,670,072 B2 * | 6/2017 | Gilmore | G01N 33/18 |
| 9,958,253 B2 * | 5/2018 | Iddan | G01B 9/02044 |
| 10,029,227 B2 * | 7/2018 | Howell | G01N 21/253 |
| 10,184,892 B2 * | 1/2019 | Gilmore | G01N 21/85 |
| 10,724,945 B2 * | 7/2020 | Black | G01N 21/3504 |
| 2002/0011567 A1 | 1/2002 | Ozanich | |
| 2006/0055923 A1 * | 3/2006 | Stewart | G01J 3/44 356/301 |
| 2007/0291266 A1 * | 12/2007 | Handa | G01J 3/02 356/328 |
| 2009/0109518 A1 | 4/2009 | Atkin | |
| 2010/0032582 A1 * | 2/2010 | Xia | G01J 3/08 250/458.1 |
| 2013/0146754 A1 * | 6/2013 | Chang | G01J 1/42 250/227.23 |
| 2014/0005078 A1 | 1/2014 | Howell et al. | |
| 2014/0226158 A1 * | 8/2014 | Trainer | G01J 3/0218 356/336 |
| 2014/0296089 A1 * | 10/2014 | Holmes | G01N 33/56983 506/9 |
| 2015/0369663 A1 * | 12/2015 | Margalit | G01J 3/26 356/326 |
| 2016/0011048 A1 * | 1/2016 | Niggl | G01J 3/42 356/328 |
| 2018/0313758 A1 * | 11/2018 | Hsieh | G01N 21/6452 |
| 2018/0353957 A1 * | 12/2018 | Bishop | G01N 15/1484 |
| 2019/0129314 A1 * | 5/2019 | Van Benten | G03F 7/70716 |
| 2019/0346441 A1 * | 11/2019 | Hegedus | G01N 33/536 |

FOREIGN PATENT DOCUMENTS

| | | |
|---|---|---|
| EP | 1962084 | 8/2008 |
| GB | 2498086 A | 7/2013 |
| WO | WO 99/40419 | 8/1999 |
| WO | WO 99/46971 | 9/1999 |
| WO | WO 2004/060585 | 7/2004 |

OTHER PUBLICATIONS

International Search Report and Written Opinion were dated Aug. 16, 2017 by the International Searching Authority for International Application No. PCT/SE2017/050621, filed on Jun. 12, 2017 and published as WO/2017/213582 on Dec. 14, 2017 (Applicant—Bomill AB) (10 Pages).

* cited by examiner

DETECTOR SYSTEM COMPRISING A PLURALITY OF LIGHT GUIDES AND A SPECTROMETER COMPRISING THE DETECTOR SYSTEM

CROSS-REFERENCE TO RELATED APPLICATIONS

This application is a U.S. National Phase Application of International Application No. PCT/SE2017/050621, filed Jun. 12, 2017, which claims priority to Swedish Application No. 1650816-0, filed Jun. 10, 2016, each of which are hereby incorporated by reference in their entirety.

TECHNICAL FIELD

The present invention relates in general to a detector system for optically detecting an object characteristic, e.g. quality, of an object.

BACKGROUND

There are a lot of different detector systems on the market today configured for a lot of different applications. One such application is the sorting bulk of objects, where the quality of the objects differs. Example of such objects may be different types of granules, such as grains. Such objects may be illuminated and the light reflected from or passing trough the object may be collected by a detector. The detector preferably generates a plurality of measurement variables, such that multivariate analysis may be performed in order to determine the quality of the object. Some detector systems comprises a standard spectrometer having a gate or port for incoming light. At the port there may be a grating or prism for diffracting the received light into different wavelength ranges. Also, such a detector system may comprise a number of mirrors and/or lenses for projecting the diffracted light onto the detector.

The most common detectors are made up by sensor arrays, i.e. there are a lot of small detectors or sensors arranged closely together. Such a detector is a Charge-Coupled Device, CCD, such as linear CCDs. It is also possible to use detectors in form of sensor arrays, without capacitors, provided with other amplification options.

The detector system may be arranged to detect different wavelength ranges. If an Indium Gallium Arsenic, InGaAs, diode array is used as detector; the normal range may be 900-1700 nm. If for example one diode array having 256 photodiodes is used, each photodiode will cover a wavelength range of 3,125 nm. Such a detector will have a resolution of 256 different wavelength ranges, ranging from 900 nm to 1700 nm and each being 3,125 nm wide. In use the amount of light that is collected by each pixel or photodiode will be monitored and a diagram showing the registered amount of light for each pixel or photodiode is called a spectrum. As for a camera it is often possible to select a time of exposure which is adapted to luminance of the object and the sensitivity of the pixels or photodiodes, i.e. how much light each pixel needs in order to get a good reading. There are also diode arrays, such as for example diode arrays based on Silicon, Si, which work in the wavelength range of 400-1050 nm. Such a Si diode array is much cheaper, but has the disadvantage that it predominantly needs more light in order to give qualitative reading, which indicates that the time of exposure needs to be longer than for the InGaAs diode array.

Devices for sorting objects, e.g. that referred to in WO2004/060585 A1, put high demands on the time for each exposure. Such a detector system is capable of sorting up to 250 granules per channel and second or 1 granule per each 4 ms.

However, there is a need for a detector system that gives readings from more pixels, including faster change of channel and lower delay, while simultaneously allowing for increased life span, lower light loss, but still being capable to determine an object characteristic with high accuracy.

SUMMARY

An object with embodiments of the present invention is to provide a detector system mitigating and/or eliminating the drawbacks identified above.

This object is achieved by providing a detector system comprising a plurality of light guides, each guiding incoming light from a respective object in use, wherein the incoming light is provided by means of an illuminating means. The detector system further comprises a diffracting means for diffracting the incoming light in different wavelength ranges. At least one focuser, e.g. focusing item, is provided for projecting the incoming light exiting the light guides onto the diffracting means. A detector having a detector area in use receives the diffracted light from the plurality of light guides. The detector system further comprises a control unit arranged to operate the illuminating means such as to pulsate incoming light via only one light guide at a time based on a pulse timing parameter, and record a spectrum of light diffracted from each light guide and detected by the detector based on the pulse timing parameter.

BRIEF DESCRIPTION OF THE DRAWINGS

These and other aspects, features and advantages of embodiments of the present disclosure will be apparent and elucidated from the following description of various embodiments, reference being made to the accompanying drawings, in which.

DETAILED DESCRIPTION

In the following description, for purposes of explanation and not limitation, specific details are set forth, such as particular components, elements, techniques, etc. in order to provide a thorough understanding of the exemplifying embodiments. However, it will be apparent to one skilled in the art that the exemplifying embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

An overall object of the present invention is to provide a detector system that gives very fast readings, while allowing for determination of an object characteristic with high accuracy, at a low cost.

The optical configuration of the detector system is arranged such that a single detector may be used to detect readings from light originating from several light guides, each conveying light from a respective object. This not only reduces the costs of the system, but also the detection speed is increased by letting the detector be as small as possible for faster readout.

Figure 1:
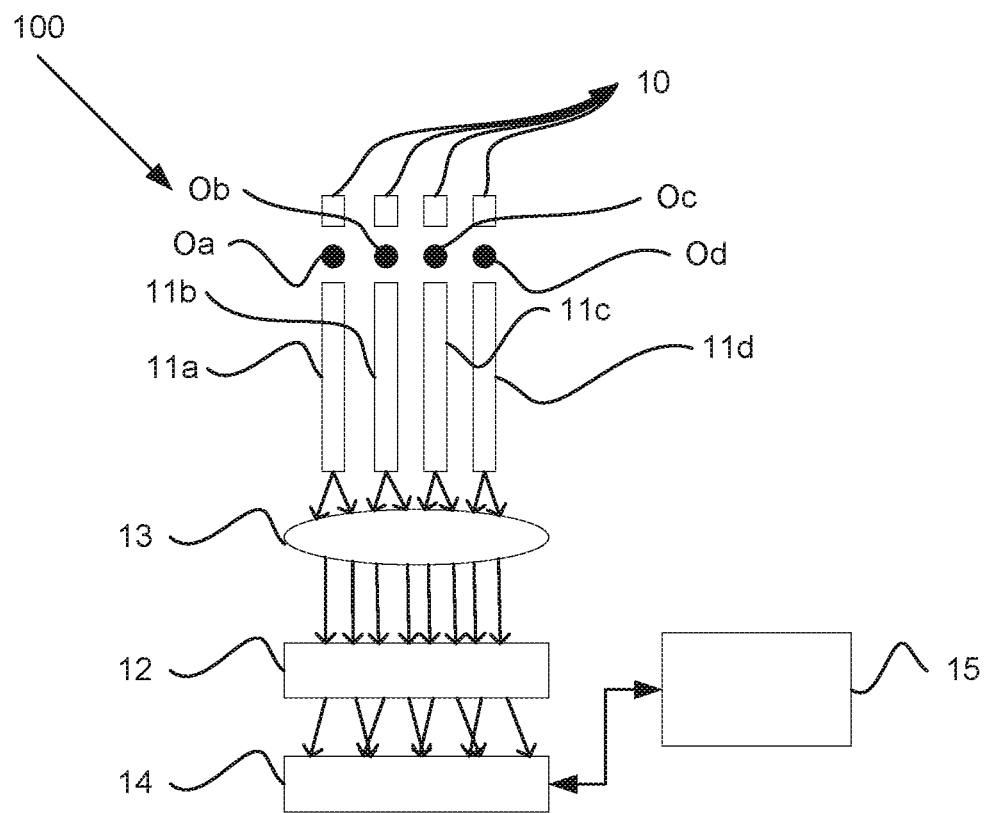
FIG. 1 is a schematic view of a detector system.

Turning now to FIG. 1 a schematic view of a detector system 100 is shown. The detector system 100 comprises a plurality of light guides 11a, 11b, 11c, 11d, such as optical fibers, each guiding incoming light from a respective object Oa, Ob, Oc, Od in use. The incoming light is provided by means of an illuminating means 10, such as a lamp, LED, laser, stroboscope, etc. A diffracting means 12 is arranged for diffracting the incoming light in different wavelengths. At least one focuser, such as a convex lens 13, is arranged for projecting the incoming light exiting the light guides onto the diffracting means. The convex lens may be replaced with a mirror (concave), allowing for the focusing of light. One alternative to a convex lens 13 or mirror is to grind the tip of the light guide, such as the optical fiber, to accomplish the same focusing effect as the lens 13 or mirror.

The detector system 100 further comprises a detector 14 having a detector area for receiving the diffracted light from the plurality of light guides. Moreover, the detector system 100 comprises a control unit 15 arranged to operate the illuminating means 10 such as to pulsate incoming light via only one light guide at a time based on a pulse timing parameter, and record a spectrum of light diffracted from each light guide and detected by the detector 14 based on the pulse timing parameter.

The illuminating means 10 may comprise one or more light sources for providing light into each light guide.

The illuminating means may be arranged to provide light within the range of preferably 800 nm to 2600 nm.

The light source of the illuminating means may be a Light Emitting Diode. Optionally the illuminating means comprises more than one LED illuminating means, each providing light in a different wavelength spectrum.

Alternatively, each illuminating means may comprise at least one LED, at least one laser or at least one stroboscope illuminating means, each providing light in a different wavelength spectrum.

As shown in FIG. 1 each light guide is arranged to receive incoming light from a respective object.

The detector system is preferably arranged such that the illuminating means 10 or optionally a light guide guiding the light emitted from the illuminating means (not shown) is arranged on one side of the object and that the corresponding light guide 11a, 11b, 11c, 11d for receiving incoming light from the object Oa, Ob, Oc, Od is arranged on another side of the object. In other words, each object Oa, Ob, Oc, Od is arranged to be positioned between the illuminating means and its corresponding light guide 11a, 11b, 11c, 11d receiving the incoming light from the respective object. Accordingly, the light from the illuminating means 10 is transmitted through the object and is then at least partly collected by a corresponding light guide receiving the incoming light from the object. The detector system may also be arranged such that the illuminating means 10 or optionally a light guide guiding the light emitted from the illuminating means is arranged on one side of the object and that the corresponding light guide 11a, 11b, 11c, 11d for receiving incoming light from the object Oa, Ob, Oc, Od is arranged on the same side of the object.

The diffracting means 12 may e.g. be a grating or prism diffracting the incoming light into several wavelengths.

The at least one convex lens may be provided in the light path downstream the diffracting means 12 for projecting the incoming light exiting the light guides onto the detector area of the detector 14.

Optionally one or more convex lenses (not shown) may be arranged in the light path between the diffracting means 12 and the detector 15.

The control unit 15 may comprise a processor and memory. The pulse timing parameter may relate to a timing schedule or timing signal indicating the timing for activation of each illuminating means such as to provide light into only one respective light guide 11a, 11b, 11c, 11d at a time. The control unit may be further arranged to compare the shape of the recorded spectrum with at least one reference spectrum, and make a decision whether the recorded spectrum matches the reference spectrum. The control unit may also be arranged to compare information, such as calculations, associated with the recorded spectrum with specific and corresponding associated information and/or threshold value(s) created from a number of reference spectra, and make a decision whether the information/calculations from the recorded spectrum matches said information and/or threshold value(s). In this way the separation speed may be increased.

Accordingly, the control unit does not necessarily have to compare all of the information associated with the recorded spectrum to corresponding information of the at least one reference spectrum, but reduced information or extracted information of interest could also be compared. By comparing reduced information the overall matching speed may be increased.

The control unit may be further arranged to identify a characteristic of the associated object based on a match between the recorded spectrum and the at least one reference spectrum.

One reference spectrum per light guide 11a, 11b, 11c, 11d and object characteristic may be prerecorded into the control unit, e.g. during a calibration process.

The object characteristic may refer to:
1) Natural components of plant fruits or seeds (grains), such as protein content, water content, starch content, beta-glucans, etc;
2) Species and varieties of fruits or seeds, such as hybrids, GMO's, etc;
3) Inner structural characteristics of fruits and seeds, such as transparency, cell wall thickness, globular structures, etc;
4) Foreign components of fruits and seeds such as microorganisms, toxins, additives, etc;
5) Functional properties of fruits and seeds such as juiciness, germiability, vitality, gluten quality, etc; or
6) State of modification of fruits and seeds such as falling number, ageing, etc. One or more reference spectrums per light guide for different levels of each object characteristic could also be recorded. This will result in a set of reference spectrums for each light guide, wherein each reference spectrum will relate to a certain characteristic or level thereof.

Since the control unit controls the operation of the illuminating means such that only one light guide receives light at a time, it will accordingly select the corresponding set of reference spectrums available for the active light guide, and compare the recorded spectrum received via said active light guide with the reference spectrums available for said active light guide. Since the reference spectrums are prerecorded for each light guide, there will be no need of additional signal processing, in form of image analysis, such as translation along the width axis of the recorded spectrum in relation to the reference spectrum. This significantly speeds up the processing time.

As may be seen in FIG. 1 a first sub area of the detector area for receiving light diffracted from a first light guide may overlap on the detector area with a second sub area of the detector area for receiving light diffracted from a second light guide. However, since the light from only one light guide, and thus object, at a time hits the detector due to the pulsating light, it is possible to record an individual spectrum from each object.

Figure 2:
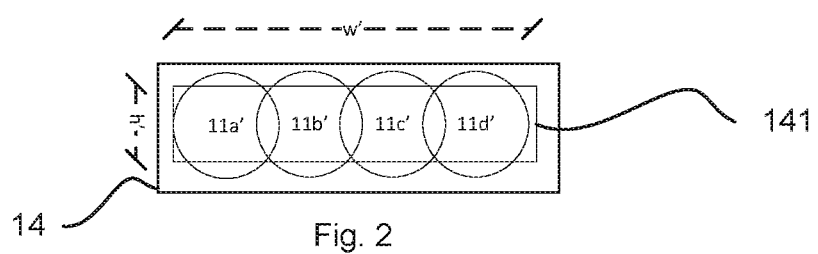
FIG. 2 is a front view of a detector, with light beams thereon, of the detector system for a first geometrical configuration of light guides.

FIG. 2 shows an arrangement where the each of the light guides 11a, 11b, 11c, 11d are arranged side by side in a geometrical configuration, which results in a number of diffracted light beams 11a', 11b', 11c', 11d' hitting the detector along the width w' of the detector area 141. Each diffracted light beam 11a', 11b', 11c', 11d' comprises light from each object Oa, Ob, Oc, Od.

Figure 3:
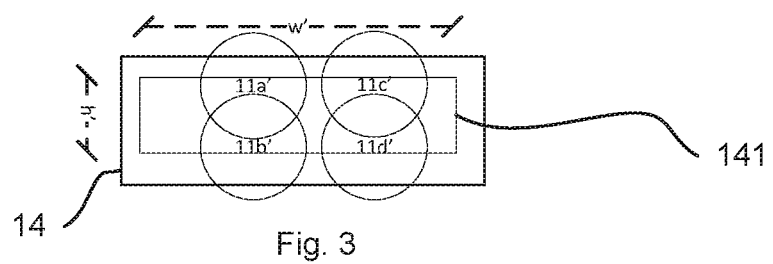
FIG. 3 is a front view of a detector, with light beams thereon, of the detector system for a second geometrical configuration of light guides.

With reference to FIG. 3, at least two of the plurality of light guides 11a, 11b, 11c, 11d may be arranged one above the other along a height axis in a geometrical configuration, and wherein the detector area 141 has a height h' extending parallel to the height axis and a width w' for receiving the diffracted light from the plurality of light guides. In this way more than one diffracted light beam 11a', 11b', 11c', 11d' may hit the detector area.

It should be appreciated that the detector area does not need to be a 2D detector area for this to work, as it is possible to arrange the detector area in the area where the light beams overlap. Hence, a detector area having only one pixel along the height axis may be used, as long as some of the light from each light beam 11a', 11b', 11c', 11d' hits the detector area.

However, for some applications the detector may comprise a 2D detector area. This may be preferred when more than one diffracted light beam is arranged to hit the detector area along the height axis thereof, and depending on the type of detector.

Figure 4:
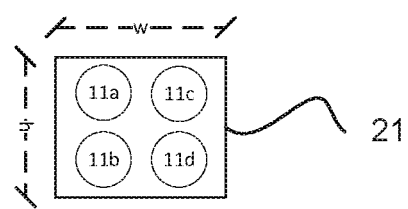
FIG. 4 is a front view of a light guide holder.

The geometrical configuration of the light guides 11a, 11b, 11c, 11d may be attained by a light guide holder 21, arranged as a matrix, with more than one row and more than one column, as shown in FIG. 4 showing a front view of the light guide holder 21. Each position of the light guide holder is arranged to be occupied by a light guide. The light guide holder 21 may thus be arranged to receive the ends of the light guides 11a, 11b, 11c, 11d and be placed in front of diffracting means, i.e. upstream in the light path of the diffracting means Alternatively, the light guide holder 21 may be arranged as a matrix comprising one row and one or more columns for receiving light guides for each receiving position along its width axis.

The object may e.g. be a granule e.g. a fruit, a kernel; a seed, a single grain, a processed piece of grain; a granular grain product; a pulse; a lentil; a bean; a nut; any fruit of plant origin; any recyclables; any granule containing any natural or synthetic (active) component of organic nature, or any other granule material of organic nature and/or containing organic material.

The detector area may have a width w' of less than 256, such as 128 pixels, 64 pixels, 32 pixels, 16 pixels or 8 pixels.

The recorded spectrum may pertain to a direct read out from each pixel of the associated sub area of the detector. In this way it is possible to avoid subsequent averaging of the detector pixel intensities of the recorded spectrum that otherwise introduces undesired summation of individual pixel noises.

Alternatively, the recorded spectrum may also pertain to a direct read out from each pixel of the detector.

The control unit may be arranged to normalize each recorded spectrum before comparing the recorded spectrum to the at least one reference spectrum of the associated set of reference spectrums. Also, the control unit may be arranged to normalize each reference spectrum before storing it into the memory. Alternatively, the control unit could normalize each reference spectrum upon comparing the reference spectrum with the recorded spectrum.

The detector may be a photo sensor connected to at least one Analog Digital AD converter for instant read out from the detector.

Alternatively, the detector may comprise a CMOS sensor, comprising a CMOS substrate, allowing for sequential read out from the detector.

Alternatively, the signals from the detector may be processed using analog electronics for prediction of the characteristics of the granule.

The sub area of the detector area associated with each diffracted light beam 11a', 11b', 11c', 11d' may comprise between 8 and 32 pixels, such as 8 to 16 pixels, such as 8 pixels.

The detector system presented above could be arranged as part of a spectrometer (not shown).

Although the detector system above has been presented with drawings showing a four channel system, i.e. four objects, four light guides 11a, 11b, 11c, 11d, and four light beams 11a', 11b', 11c', 11d' hitting the detector, it should be appreciated that the present invention is not limited to a four channel system. In fact any configuration having more than two channels may be used without departing from the invention.

Thus, it is believed that different embodiments have been described thoroughly for purpose of illustration and description. However, the foregoing description is not intended to be exhaustive or to limit example embodiments to the precise form disclosed. Thus, modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

Although the incoming light from the object has been presented above as originating from a transmission through the associated objects, e.g. granules, it is equally possible that the incoming light relate to light which has been reflected on said objects. Accordingly, the illuminating means 10 does not have to be positioned at an opposite side of the object in relation to the plurality of light guides 11a. 11b, 11c, 11d receiving the incoming light. Rather the illuminating light source could also be positioned at the same side of the object, or at any suitable angle in relation to the plurality of light guides for receiving the incoming light.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the example embodiments, that the example embodiments may be implemented at least in part by means of both hardware and software, and that several "means", "units" or "devices" may be represented by the same item of hardware.

The invention claimed is:

1. A detector system comprising
a plurality of illuminating means,
a plurality of light guides comprising a first light guide and a second light guide, each guiding incoming light provided by means of a corresponding illuminating means of the plurality of illuminating means, each illuminating means of the plurality of illuminating means comprises at least one light source for providing the incoming light into each corresponding light guide, wherein light from the illuminating means is configured to be transmitted through a respective object and at least partially be collected by a corresponding light guide receiving the incoming light transmitted through the respective object,
at least one focuser for projecting the collected incoming light exiting the plurality of light guides,
diffracting means for diffracting the projected incoming light from the at least one focuser in different wavelength ranges,
a detector having a detector area for receiving the diffracted projected incoming light, and
a control unit arranged to:
pulsate the incoming light via only one light guide at a time based on a pulse timing parameter configured to indicate the timing for activation of each illuminating means of the plurality of illuminating means, and
record a spectrum of light diffracted from each light guide and detected by the detector based on the pulse timing parameter,
wherein the detector area comprises a first sub area that is distinct from a second sub area, wherein the first and second sub areas partially overlap, wherein the entire first sub area only receives light diffracted from the first light guide and the entire second sub area only receives light diffracted from the second light guide, and
wherein at least two of the plurality of light guides are arranged one above the other along a height axis in a geometrical configuration, and wherein the detector area has a height extending parallel to the height axis and a width for receiving the diffracted light beams from the plurality of light guides.

2. The detector system according to claim 1, wherein the geometrical configuration is in the shape of a light guide holder with more than one row and more than one column, wherein each position of the light guide holder is arranged to be occupied by a light guide.

3. The detector system according to claim 1, wherein the object is a granule.

4. The detector system according to claim 1, wherein the detector area has a width of less than 256 pixels.

5. The detector system according to claim 1, wherein the detector comprises a 2D detector area.

6. The detector system according to claim 1, wherein the control unit is further arranged to:
compare information associated with the recorded spectrum with corresponding information associated with at least one reference spectrum, and
make a decision whether the recorded spectrum matches the reference spectrum.

7. The detector system according to claim 6, wherein the control unit is further arranged to:
identify a characteristic of the associated object based on a match between the recorded spectrum and the at least one reference spectrum.

8. The detector system according to claim 1, wherein the recorded spectrum pertains to a direct read out from each pixel of an associated sub area of the detector.

9. The detector system according to claim 1, wherein the detector is a photo sensor connected to at least one Analog Digital (AD) converter for instant read out from the detector.

10. The detector system according to claim 1, wherein the detector comprises a CMOS substrate for sequential read out from the detector.

11. The detector system according to claim 1, wherein the illuminating means is arranged to provide light within the range of 800 nm to 2600 nm.

12. The detector system according to claim 11, wherein each illuminating means comprises at least one LED illuminating means.

13. The detector system according to claim 11, wherein each illuminating means comprises at least one LED, at least one laser or at least one stroboscope illuminating means.

14. The detector system according to claim 1, wherein an associated sub area of the detector for each light guide comprises between 8 and 32 pixels.

15. A spectrometer comprising the detector system according claim 1.

* * * * *